(12) United States Patent
Yamada

(10) Patent No.: US 6,831,951 B2
(45) Date of Patent: Dec. 14, 2004

(54) IMAGE DATA PROCESSING APPARATUS AND MOTION COMPENSATION PROCESSING METHOD USED THEREFOR, AND RECORDING MEDIUM

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 781 days.

(21) Appl. No.: 09/796,466

(22) Filed: Mar. 2, 2001

(65) Prior Publication Data

US 2001/0022817 A1 Sep. 20, 2001

(30) Foreign Application Priority Data

Mar. 8, 2000 (JP) ........................................ 2000-063066

(51) Int. Cl.$^7$ ............................................. H04N 11/02
(52) U.S. Cl. .................. 375/240.25; 708/400; 708/402; 375/240.2
(58) Field of Search .................... 375/240.16, 240.2, 375/240.25, 240.27; 708/400, 402, 403, 404, 405

(56) References Cited

U.S. PATENT DOCUMENTS

| | | | | |
|---|---|---|---|---|
| 5,647,049 A | * | 7/1997 | Odaka et al. ............... | 386/124 |
| 5,671,169 A | * | 9/1997 | Huang ........................ | 708/402 |
| 5,737,256 A | * | 4/1998 | Nakagawa et al. ......... | 708/400 |
| 5,844,609 A | * | 12/1998 | Filor et al. .............. | 375/240.01 |
| 6,266,374 B1 | * | 7/2001 | Choi ...................... | 375/240.21 |
| 6,473,461 B1 | * | 10/2002 | Wang ..................... | 375/240.16 |
| 2003/0043918 A1 | * | 3/2003 | Jiang et al. ............ | 375/240.25 |
| 2003/0088601 A1 | * | 5/2003 | Pitsianis ................. | 708/622 |

FOREIGN PATENT DOCUMENTS

CA 2310652 7/1999

OTHER PUBLICATIONS

Canadian Office Action dated Jan. 16, 2003.
Canadian Patent Application with drawings.
Canadian Office Action dated Aug. 12, 2003.

* cited by examiner

Primary Examiner—Chris Kelley
Assistant Examiner—George Bugg, Jr.
(74) Attorney, Agent, or Firm—Whitman, Curtis & Christofferson, PC

(57) ABSTRACT

A compressed data buffer 21 maintains an image data loaded from a storage device 1, and a decoding section 22 conducts variable length decoding, inverse quantization and inverse discrete cosine transform, and a pixel data shifting section 23 shifts each value of pixel data to right by 1 bit, and a motion compensating section 24 applies motion compensation processing to the data shifted to right by 1 bit, and the frame data buffer 25 stores an image data to be displayed, and a reference data calculating section 24a of the motion compensating section 24 obtains a reference data from a reference buffer based on a motion vector, and a reference data adding section 24b adds the reference data to a data to which decoding processing has been applied, and a reference data storing section 24c leaves in the reference buffer the data to which the motion compensation processing has been applied.

10 Claims, 3 Drawing Sheets

IMAGE DATA PROCESSING APPARATUS AND MOTION COMPENSATION PROCESSING METHOD USED THEREFOR, AND RECORDING MEDIUM

BACKGROUND OF THE INVENTION

The present invention relates to an image data processing apparatus and a motion compensation processing method used therefor, and more particularly, to motion compensation processing out of MPEG2 (Moving Picture Experts Group phase 2) decoding processing.

In recent years, as a coding method for storage of a color moving image, standardization work is conducted by means of an MPEG. In the coding method of this MPEG, there are MPEG1, MPEG2 and so forth, and in the MPEG1, a transfer speed is about 1.5 Mbps, and storage media such as a CD-ROM (Compact Disk-Read Only Memory) are mainly objects to which it is applied, and a motion compensation estimation/DCT (Discrete Cosine Transform) method into which periodical intra-frame coding is introduced is used for its coding algorithm.

In the MPEG2, a transfer speed is in a wide range between several Mbps and several ten Mbps, and like the MPEG1, storage media are objects to which the MPEG2 is applied, and in addition thereto, picture transmission and so forth in which next-generation television broad casting and a wide band ISDN (Integrated Service Digital Network) are utilized are also an object, and the MPEG2 has compatibility with the MPEG1.

Here, the motion compensation estimation/DCT method is a method in which an estimated error obtained by motion compensation inter-frame estimation is encoded by using DCT, and in the method, intra-frame coding by means of the DCT is conducted without using the motion compensation inter-frame estimation, when the estimation is difficult at the beginning of a motion image sequence and at a scene change and so forth.

An image compressed by means of the MPEG method is decoded through variable length decoded (VLD) processing, inverse scan processing, inverse quantization (IQ) processing, inverse discrete cosine transform (IDCT) processing and motion compensation (MC) processing.

The decoded data is represented as a set of values indicated by luminance 8 bits and color difference 8 bits per pixel. However, at an end time point of each processing, data length per pixel is not always represented by 8 bits. The data after the inverse discrete cosine transform processing is finished is represented by 9 bits per pixel.

Out of the above-mentioned decoding processing of the MPEG2, since an pixel data is handled by 9 bits per pixel in the motion compensation processing, overflow occurs in an apparatus in which it is assumed that a data is handled by 8 bits, and the data cannot be decoded correctly. Accordingly, such an apparatus is designed so that the image data is divided into two 8-bit data.

However, in such a method, since processing for dividing the data into two 8-bit data and quantity of a data to be transferred to a motion compensating section are increased, quantity of processing necessary for decoding is increased.

SUMMARY OF THE INVENTION

Therefore, the objective of the present invention is to solve the above-described tasks.

Also, the objective of the present invention is to provide an image processing apparatus and a motion compensation processing method used therefor, and a recording medium, which are capable of realizing motion compensation processing by means of a more simple apparatus and transferring a data after inverse discrete cosine transform to a motion compensating section at a high speed.

The present invention for accomplishing the above-described objective is an image data processing apparatus in which decoding of a compressed image data is conducted through variable length decoding processing, inverse scan processing, inverse quantization processing, inverse discrete cosine transform processing and motion compensation processing, characterized in that the apparatus has:

a divider for dividing a data after the inverse discrete cosine transform processing is completed into halves; and a motion compensation processor for repeatedly applying the motion compensation processing to the above-described halved data two times.

Also, the above-described divider for dividing the data into halves is characterized in that it includes a divider for shifting the data after the above-described inverse discrete cosine transform processing, which is represented by 9 bits, to right by 1 bit, and dividing a value thereof into halves.

Also, for an estimated error which is obtained by motion compensation inter-frame estimation, the above-described motion compensation processor is characterized in that it includes an adder for adding a pixel data shifted to right by 1 bit in conducting decoding of an encoded compressed data using the inverse discrete cosine transform processing to a reference data two times, which is used for the above-described motion compensation inter-frame estimation.

The present invention for accomplishing the above-described objective is an image data processing apparatus in which decoding of a compressed image data is conducted through variable length decoding processing, inverse scan processing, inverse quantization processing, inverse discrete cosine transform processing and motion compensation processing, characterized in that the apparatus has:

a divider for shifting a data after inverse discrete cosine transform processing, which is represented by 9 bits, to right by 1 bit, and dividing a value thereof into halves; and for an estimated error which is obtained by motion compensation inter-frame estimation, a motion compensation processor for adding a pixel data shifted to right by 1 bit in conducting decoding of an encoded compressed data using the inverse discrete cosine transform processing to a reference data two times, which is used for the above-described motion compensation inter-frame estimation.

The present invention for accomplishing the above-described objective is a motion compensation processing method of an image data processing apparatus in which decoding of a compressed image data is conducted through variable length decoding processing, inverse scan processing, inverse quantization processing, inverse discrete cosine transform processing and motion compensation processing, characterized in that the method has steps of:

dividing a data after the inverse discrete cosine transform processing is completed into halves; and repeatedly applying the motion compensation processing to the above-described halved data two times.

Also, the above-described step of dividing the data into halves is characterized in that it includes a step of shifting the data after the above-described inverse discrete cosine transform processing, which is represented by 9 bits, to right by 1 bit, and dividing a value thereof into halves.

Also, for an estimated error which is obtained by motion compensation inter-frame estimation, the above-described step of applying the motion compensation processing is characterized in that it includes a step of adding a pixel data shifted to right by 1 bit in conducting decoding of an encoded compressed data using the inverse discrete cosine transform processing to a reference data two times, which is used for the above-described motion compensation inter-frame estimation.

The present invention for accomplishing the above-described objective is a recording medium in which a program is stored for making a computer execute decoding processing of a compressed image data through variable length decoding processing, inverse scan processing, inverse quantization processing, inverse discrete cosine transform processing and motion compensation processing, characterized in that the above-described program makes the computer execute steps of:

dividing a data after the inverse discrete cosine transform processing is completed into halves; and repeatedly applying the motion compensation processing to the above-described halved data two times.

Also, the above-described step of dividing the data into halves is characterized in that it includes a step of shifting the data after the above-described inverse discrete cosine transform processing, which is represented by 9 bits, to right by 1 bit, and dividing a value thereof into halves.

Also, for an estimated error which is obtained by motion compensation inter-frame estimation, the above-described step of applying the motion compensation processing is characterized in that it includes a step of adding a pixel data shifted to right by 1 bit in conducting decoding of an encoded compressed data using the inverse discrete cosine transform processing to a reference data two times, which is used for the above-described motion compensation inter-frame estimation.

In other words, the motion compensation processor in the image data processing apparatus of the present invention provides means for simplifying the motion compensation processing that is one of decoding procedures in decoding a compressed image by means of an MPEG2 method.

More particularly, in the image data processing apparatus of the present invention, an original image stored in a storage device and compressed by means of the MPEG2 method is loaded, and the image data is decoded and is sent to a display.

As mentioned above, the image compressed by means of the MPEG method is decoded through variable length decoded (VLD) processing, inverse scan (I Scan) processing, inverse quantization (IQ) processing, inverse discrete cosine transform (IDCT) processing and motion compensation (MC) processing. The decoded data is represented as a set of values indicated by luminance 8 bits and color difference 8 bits per pixel.

However, at an end time point of each processing, data length per pixel is not always represented by 8 bits. The data after the inverse discrete cosine transform processing is finished is represented by 9 bits per pixel. Accordingly, overflow occurs in an apparatus in which it is assumed that one data is handled by 8 bits, and the data cannot be decoded correctly.

Therefore, by dividing a data after the inverse discrete cosine transform processing, which is represented by 9 bits per pixel, into halves, sending it to the motion compensation processor, and in the motion compensation processor, conducting usual motion compensation processing two times, a problem due to the overflow is avoided.

In other words, in the image data processing apparatus of the present invention, the image data represented by 9 bits is shifted to right by 1 bit, and its value is divided in two and it is transferred to the motion compensation processor, and motion compensation processing is repeatedly conducted two times in the motion compensation processor, and thereby, quantity of transfer processing is reduced by half. Also, it is possible to reduce quantity of a buffer by half compared with a conventional method in which two buffers of 8 bits per pixel are used.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
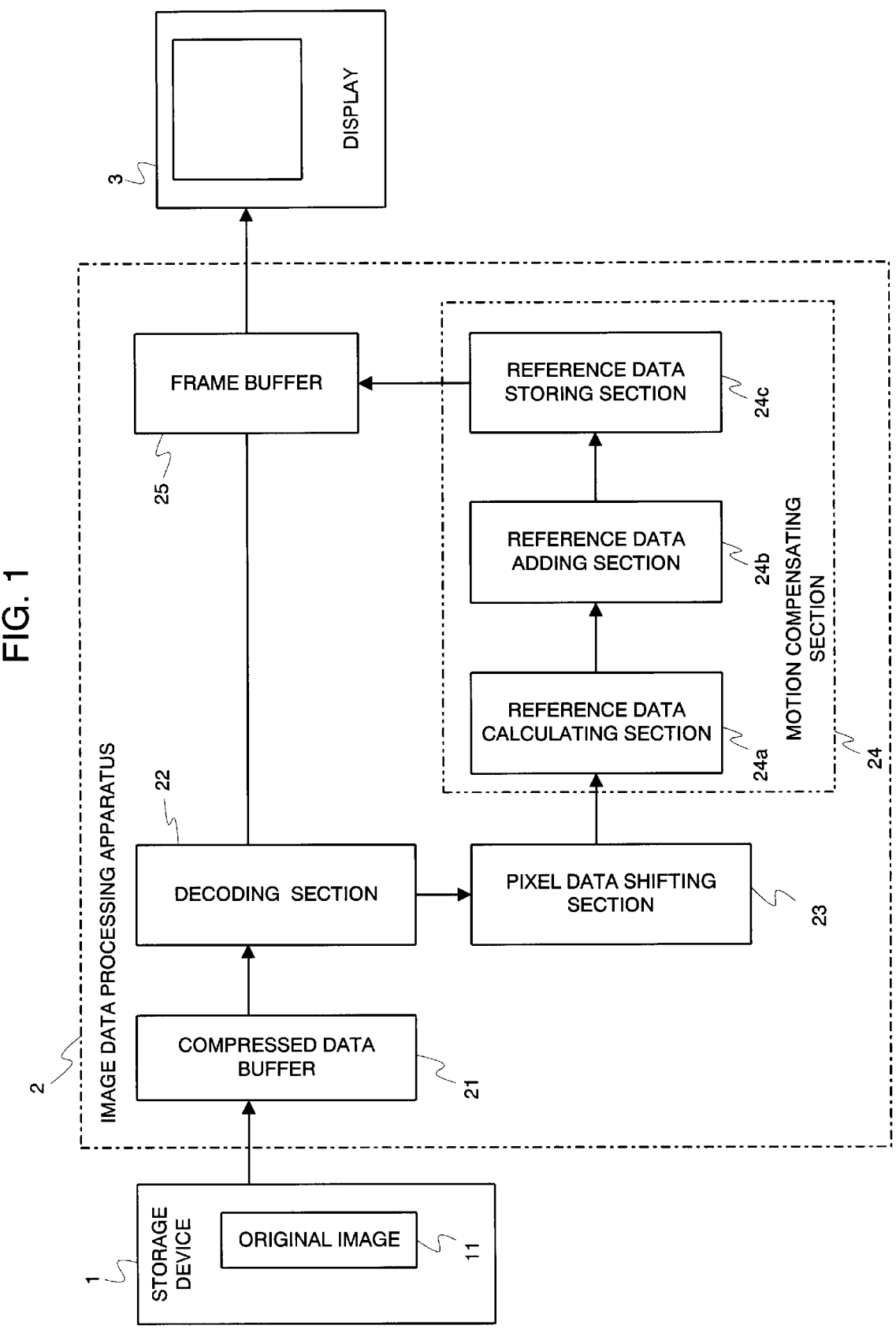
FIG. 1 is a block diagram showing an arrangement of an image data processing apparatus in accordance with one embodiment of the present invention.

Next, one embodiment of the present invention will be explained by referring to the drawings. FIG. 1 is a block diagram showing an arrangement of an image data processing apparatus in accordance with one embodiment of the present invention. In FIG. 1, an image data processing apparatus 2 operates in accordance with program control, and processes a compressed image data stored in a storage device 1, and displays the image data on a display 3.

The storage device 1 stores an original image 11 compressed by means of an MPEG2 method. The display 3 displays on its display section an image data decoded in the image data processing apparatus 2.

The image data processing apparatus 2 is constructed of a compressed data buffer 21, a decoding section 22, a pixel data shifting section 23, a motion compensating section 24 and a frame data buffer 25, and the motion compensating section 24 is constructed of a reference data calculating section 24a, a reference data adding section 24b and a reference data storing section 24c.

The compressed data buffer 21 maintains an image data loaded from the storage device 1, and the decoding section 22 conducts variable length decoding (VLD), inverse quantization (IQ) and inverse discrete cosine transform (IDCT). The pixel data shifting section 23 shifts each value of pixel data to right by 1 bit, and the motion compensating section 24 conducts motion compensation processing, and the frame data buffer 25 stores an image data to be displayed.

The reference data calculating section 24a of the motion compensating section 24 obtains a reference data from a reference buffer (not shown) based on a motion vector, which will be used for motion compensation inter-frame estimation, and the reference data adding section 24b adds the reference data to a data to which decoding processing has been applied, and the reference data storing section 24c leaves in the reference buffer the data to which the motion compensation processing has been applied.

Figure 2:
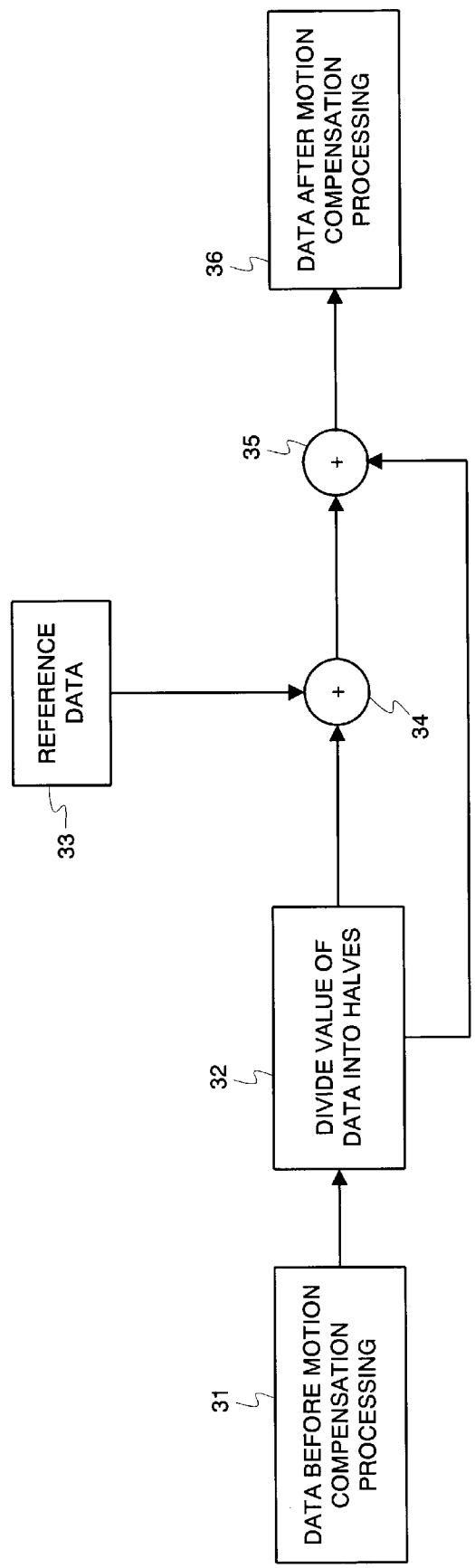
FIG. 2 is a view showing a processing operation of a motion compensating section in FIG. 1.
Figure 3:
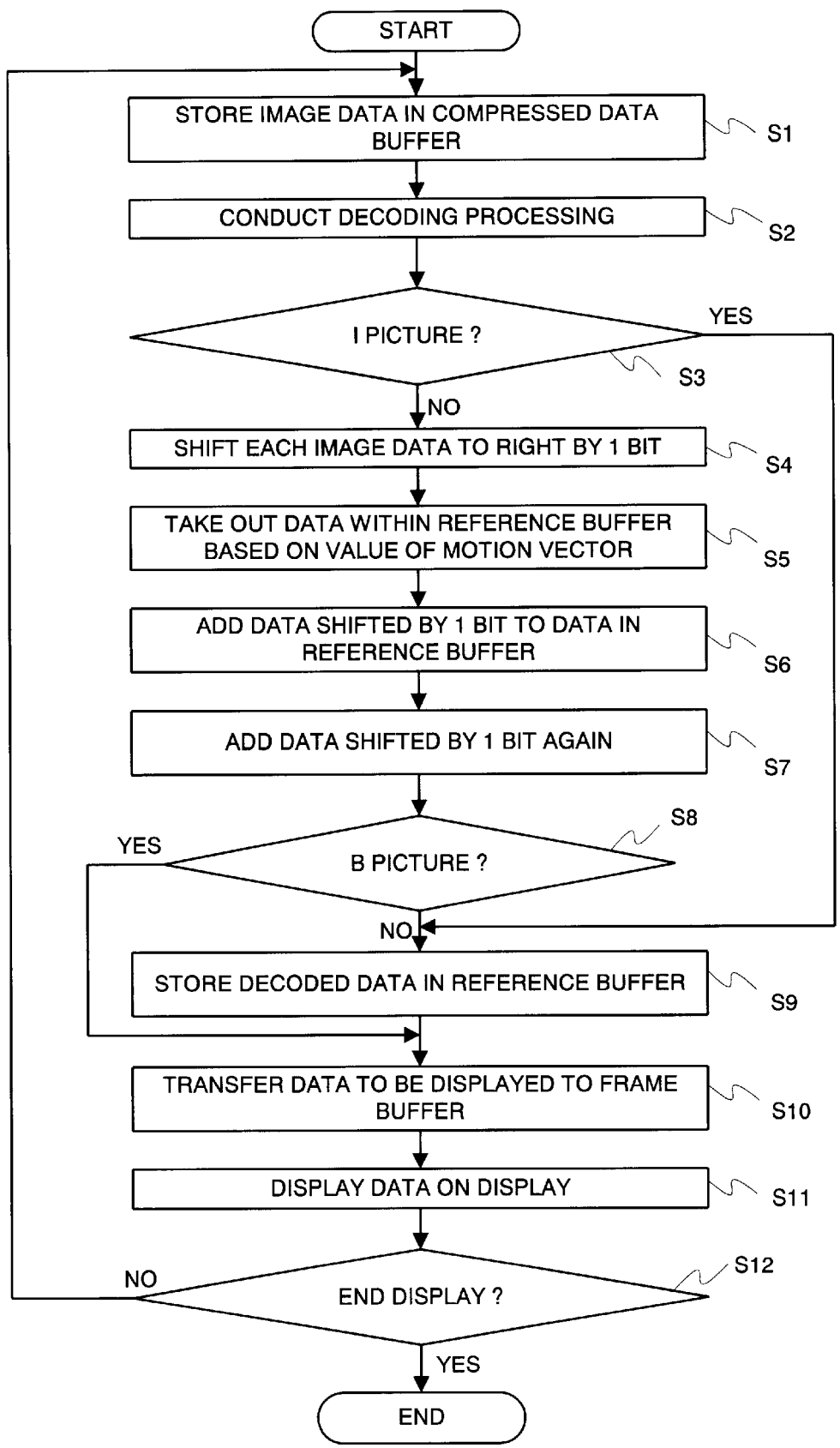
FIG. 3 is a flowchart showing a processing operation of the image data processing apparatus in FIG. 1.

FIG. 2 is a view showing a processing operation of the motion compensating section 24 in FIG. 1, and FIG. 3 is a flowchart showing a processing operation of the image data processing apparatus 2 in FIG. 1. Referring to these FIG. 1 to FIG. 3, an operation of one embodiment of the present invention will be explained.

The storage device 1 stores the original image 11 compressed by means of the MPEG2 method. First, the image data processing apparatus 2 loads an image data from the storage device 1 in the compressed data buffer 21 when restoring a compressed image (STEP S1 in FIG. 3).

Next, the image data processing apparatus 2 starts decoding of a compressed image data by means of the decoding section 22 (STEP S2 in FIG. 3). In this decoding section 22, MPEG decoding processing other than motion compensation processing is conducted. In outputs of this processing, in addition to an image data represented by 9 bits per pixel, a data necessary for motion compensation of a motion vector and so forth is included.

When an image to which the motion compensation processing is applied is a P picture (Predictive-coded picture: inter-frame coded frame) and a B picture (Bidirectionally predictive-coded picture: frame interpolation coded frame) (STEP S3 in FIG. 3), the pixel data shifting section 23 shifts each image data to right by 1 bit (STEP S4 in FIG. 3). By means of this processing, the image data becomes to be within an 8-bit width.

In case that an image to which the motion compensation processing is applied is an I picture (Intra-coded picture: intra-frame coded frame), since there is no motion compensation processing, the above-described processing is not conducted.

In the motion compensating section 24, although the motion compensation processing in a usual MPEG decoding is conducted, the number of times by which a data of the reference buffer is added is different. As shown in FIG. 2, since each data is shifted to right by 1 bit in the pixel data shifting section 23 (namely, a value of the data is divided in two), different from the usual motion compensation processing, processing for adding the same value two times is conducted (processes 31–36 in FIG. 2).

By means of the processing method in this motion compensating section 24, even in the apparatus in which it is assumed that a data is handled by a 8-bit width, decoding processing can be conducted without generating overflow.

In other words, the reference data calculating section 24a calculates a reference data from a data of the reference buffer based on a value of a motion vector, which will be used for motion compensation inter-frame estimation (STEP S5 in FIG. 3). The reference data adding section 24b adds the pixel data shifted to right by 1 bit to the reference data two times (STEP S6 and S7 in FIG. 3).

In case that the decoded image data is an I picture or a P picture (STEP S8 in FIG. 3), since it becomes to be a reference data of a subsequent image data, the data is left in the reference buffer in the reference data storing section 24c (STEP S9 in FIG. 3). In case that the decoded image data is a B picture (STEP S8 in FIG. 3), since the decoded image data is not referred to, the data is not left in the reference buffer.

After the image data in which decoding has been completed is stored in the frame data buffer 25 (STEP S10 in FIG. 3), it is displayed on the display 3 (STEP S11 in FIG. 3). Unless a display on the display 3 is entirely completed (STEP S12 in FIG. 3), the process returns to STEP S1, and the next image data is decoded. Also, if the display on the display 3 is entirely completed (STEP S12 in FIG. 3), the above-described decoding processing is completed.

In this manner, the image data represented by 9 bits is shifted to right by 1 bit, and its value is divided in two and it is transferred to the motion compensating section 24, and motion compensation processing is repeated two times in the motion compensating section 24, and thereby, since motion compensation processing can be realized by half quantity of a buffer compared with a conventional method in which 16 bits are necessary for handling a 9-bit data per pixel, it is possible to realize motion compensation processing by means of a more simple apparatus.

Also, since, compared with a conventional method in which a 9-bit data per pixel is transferred, a data transfer of less data content (8 bits) is conducted, it is possible to transfer a data after inverse discrete cosine transform to the motion compensating section 24 at a high speed.

As explained above, in accordance with the present invention, in the image data processing apparatus in which decoding of a compressed image data is conducted through the variable length decoding processing, the inverse scan processing, the inverse quantization processing, the inverse discrete cosine transform processing and the motion compensation processing, a data after the inverse discrete cosine transform processing is completed is divided into halves, and by repeatedly applying the motion compensation processing to the halved data two times, it is possible to realize the motion compensation processing by means of a more simple apparatus, and accordingly, an advantage that it is possible to transfer a data after the inverse discrete cosine transform to the motion compensating section at a high speed is effected.

The entire disclosure of Japanese Patent Application No. 2000-063066 filed on Mar. 8, 2000 including specification, claims, drawing and summary are incorporated herein by reference in its entirety.

What is claimed is:

1. An image data processing apparatus in which decoding of a compressed image data is conducted through variable length decoding processing, inverse scan processing, inverse quantization processing, inverse discrete cosine transform processing and motion compensation processing, comprising:

a divider for dividing a data after said inverse discrete cosine transform processing is completed into halves; and a motion compensation processor for repeatedly applying said motion compensation processing to said halved data two times.

2. An image data processing apparatus according to claim 1, wherein said divider for dividing said data into halves includes a divider for shifting said data after said inverse discrete cosine transform processing, which is represented by 9 bits, to right by 1 bit, and dividing a value thereof into halves.

3. An image data processing apparatus according to claim 2, wherein, for an estimated error which is obtained by motion compensation inter-frame estimation, said motion compensation processor includes an adder for adding a pixel data shifted to right by 1 bit in conducting decoding of an encoded compressed data using said inverse discrete cosine transform processing to a reference data two times, which is used for said motion compensation inter-frame estimation.

4. An image data processing apparatus in which decoding of a compressed image data is conducted through variable length decoding processing, inverse scan processing, inverse quantization processing, inverse discrete cosine transform processing and motion compensation processing, comprising:

a divider for shifting a data after inverse discrete cosine transform processing, which is represented by 9 bits, to right by 1 bit, and dividing a value thereof into halves; and for an estimated error which is obtained by motion compensation inter-frame estimation, a motion compensation processor for adding a pixel data shifted to right by 1 bit in conducting decoding of an encoded compressed data using said inverse discrete cosine transform processing to a reference data two times, which is used for said motion compensation inter-frame estimation.

5. A motion compensation processing method of an image data processing apparatus in which decoding of a compressed image data is conducted through variable length decoding processing, inverse scan processing, inverse quantization processing, inverse discrete cosine transform processing and motion compensation processing, said method comprising steps of:

dividing a data after said inverse discrete cosine transform processing is completed into halves; and repeatedly applying said motion compensation processing to said halved data two times.

6. A motion compensation processing method according to claim 5, wherein said step of dividing said data into halves includes a step of shifting said data after said inverse discrete cosine transform processing, which is represented by 9 bits, to right by 1 bit, and dividing a value thereof into halves.

7. A motion compensation processing method according to claim 6, wherein, for an estimated error which is obtained by motion compensation inter-frame estimation, said step of applying said motion compensation processing includes a step of adding a pixel data shifted to right by 1 bit in conducting decoding of an encoded compressed data using said inverse discrete cosine transform processing to a reference data two times, which is used for said motion compensation inter-frame estimation.

8. A recording medium in which a program is stored for making a computer execute decoding processing of a compressed image data through variable length decoding processing, inverse scan processing, inverse quantization processing, inverse discrete cosine transform processing and motion compensation processing, said program making said computer execute steps of:

dividing a data after said inverse discrete cosine transform processing is completed into halves; and repeatedly applying said motion compensation processing to said halved data two times.

9. A recording medium according to claim 8, wherein said step of dividing said data into halves includes a step of shifting said data after said inverse discrete cosine transform processing, which is represented by 9 bits, to right by 1 bit, and dividing a value thereof into halves.

10. A recording medium according to claim 9, wherein, for an estimated error which is obtained by motion compensation inter-frame estimation, said step of applying said motion compensation processing includes a step of adding a pixel data shifted to right by 1 bit in conducting decoding of an encoded compressed data using said inverse discrete cosine transform processing to a reference data two times, which is used for said motion compensation inter-frame estimation.

* * * * *